United States Patent
Shakir et al.

(10) Patent No.: US 10,404,600 B2
(45) Date of Patent: Sep. 3, 2019

(54) MECHANISM AND APPARATUS FOR PATH PROTECTION WHEN USING COMPRESSED SEGMENT ROUTING LABEL STACKS

(71) Applicant: Google LLC, Mountain View, CA (US)

(72) Inventors: Robert Shakir, San Francisco, CA (US); Ina Minei, Zurich (CH); Paul Schultz, Saratoga, CA (US)

(73) Assignee: Google LLC, Mountain View, CA (US)

( * ) Notice: Subject to any disclaimer, the term of this patent is extended or adjusted under 35 U.S.C. 154(b) by 17 days.

(21) Appl. No.: 15/702,467

(22) Filed: Sep. 12, 2017

(65) Prior Publication Data

US 2019/0081897 A1    Mar. 14, 2019

(51) Int. Cl.
| | |
|---|---|
| *G01R 31/08* | (2006.01) |
| *H04L 12/803* | (2013.01) |
| *H04L 12/24* | (2006.01) |
| *H04L 12/723* | (2013.01) |
| *H04L 12/721* | (2013.01) |
| *H04L 12/26* | (2006.01) |
| *H04L 12/703* | (2013.01) |
| *H04L 12/911* | (2013.01) |

(52) U.S. Cl.
CPC ........ *H04L 47/125* (2013.01); *H04L 41/0668* (2013.01); *H04L 45/12* (2013.01); *H04L 45/34* (2013.01); *H04L 45/50* (2013.01); *H04L 43/0811* (2013.01); *H04L 43/0817* (2013.01); *H04L 43/10* (2013.01); *H04L 45/28* (2013.01); *H04L 45/70* (2013.01); *H04L 47/72* (2013.01)

(58) Field of Classification Search
None
See application file for complete search history.

(56) References Cited

U.S. PATENT DOCUMENTS

| | | | | |
|---|---|---|---|---|
| 2011/0242988 | A1* | 10/2011 | Rustogi | H04L 45/28 370/242 |
| 2011/0286324 | A1* | 11/2011 | Bellagamba | H04L 41/0677 370/219 |

(Continued)

OTHER PUBLICATIONS

Filsfils, Clarence, et al. "Resiliency use cases in SPRING networks" Network Working Group—Internet Draft May 8, 2017.

(Continued)

*Primary Examiner* — Gerald A Smarth
(74) *Attorney, Agent, or Firm* — McDermott Will & Emery LLP

(57) ABSTRACT

Systems and methods of network traffic engineering are provided. The system includes a switch and a controller. The controller can maintain a monitoring segment identifier set defining a path for traffic intended for a destination device. The controller can maintain a forwarding segment identifier set representing a compressed version of the monitoring segment identifier set such that traffic, when labeled according to the forwarding segment identifier set, will follow the path defined by the monitoring segment identifier set. The controller can monitor a status of the path defined by the monitoring segment identifier set. The controller can, subject to determining that the path defined by the monitoring segment identifier set is invalid, cause the switch to not label a packet received at the switch according to the forwarding segment identifier set.

20 Claims, 6 Drawing Sheets

(56) References Cited

U.S. PATENT DOCUMENTS

| | | | | |
|---|---|---|---|---|
| 2014/0204762 | A1* | 7/2014 | Allan | H04L 45/12 |
| | | | | 370/238 |
| 2014/0269266 | A1 | 9/2014 | Filsfils | |
| 2016/0359735 | A1* | 12/2016 | Zhao | H04L 45/42 |
| 2017/0111268 | A1* | 4/2017 | Swallow | H04L 45/00 |
| 2018/0077051 | A1* | 3/2018 | Nainar | H04L 45/22 |

OTHER PUBLICATIONS

Filsfils, Clarence, et al. "Segment Routing Use Cases" Network Working Group—Internet Draft Oct. 21, 2013. Retrieved from URL: http://eprints.networks.imdea.org/631/1/draft-filsfils-rtgwg-segment-routing-use-cases-02_pdf.

Filsfils, Clarence, et al. "The Segment Routing Architecture" In Global Communications Conference (GLOBECOM), IEEE, Dec. 2015.

Giorgetti, Alessio, et al. "Path Encoding in Segment Routing" In Global Communications Conference (GLOBECOM), IEEE, Dec. 2015.

Giorgetti, Alessio, et al. "Reliable Segment Routing" In 7th International Workshop on Reliable Networks Design and Modeling (RNDM), IEEE, Oct. 2015.

Litkowski, S., et al. "Implementing non protected paths using SPRING" SPRING Working Group—Internet Draft Jan. 27, 2017. Retrieved from URL: https://datatracker.ietf.org/meeting/97/agenda/spring-drafts.pdf.

Bonica, R. "A Segment Routing (SR) Tutorial" NANOG70, Juniper Networks, Jun. 6, 2017 (44 pages).

Filsfils, Clarence, et al. "Interconnecting Millions of Endpoints With Segment Routing; draft-filsfils-spring-large-scale-interconnect-04.txt" Internet Engineering Task Force, Network Working Group Internet-Draft, Oct. 30, 2016 (11 pages).

International Search Report and Written Opinion dated Sep. 4, 2018 in International (PCT) Application No. PCT/US2018/036833 (14 pages).

* cited by examiner

MECHANISM AND APPARATUS FOR PATH PROTECTION WHEN USING COMPRESSED SEGMENT ROUTING LABEL STACKS

BACKGROUND

Multiprotocol label switching (MPLS) allows computer networks to encapsulate and route packets of various protocols using short path labels in place of long network addresses. The labels identify paths between nodes (both adjacent and distant) rather than endpoints. Some MPLS networks employ segment routing, which allows for traffic routing across an MPLS dataplane using segments that indicate particular forwarding instructions. A segment can be indicated by an adjacency segment identifier or a prefix segment identifier. An adjacency segment identifier can indicate that traffic should traverse a particular link within the topology. A prefix segment identifier can indicate that traffic should take the shortest path to a particular resource; i.e., a device or set of devices. Segments defined by a prefix segment identifier can be said to be loosely routed, since the particular links to be traversed by the traffic are not strictly defined; rather, the traffic will take the shortest path towards the device or region indicated by the prefix.

SUMMARY

At least one aspect is directed to a network traffic engineering system. The traffic engineering system includes a switch and a controller. The controller is configured to maintain a monitoring segment identifier set including a sequence of adjacency segment identifiers defining a path for traffic intended for a destination device. Each adjacency segment identifier identifies a specific link of a network. The controller is configured to maintain a forwarding segment identifier set corresponding to the monitoring segment identifier set. The forwarding segment identifier set includes a compressed sequence of segment identifiers, together representing a compressed version of the monitoring segment identifier set. The compressed sequence of segment identifiers, when pushed onto a label stack, will cause traffic having the label stack to follow the path defined by the monitoring segment identifier set. The controller is configured to monitor a status of the path defined by the monitoring segment identifier set. The controller is configured to, subject to determining that the path defined by the monitoring segment identifier set is valid, cause the switch to push the compressed sequence of segment identifiers onto a first label stack of a first data packet received by the switch prior to transmitting the first data packet. The controller is configured to, subject to determining that the path defined by the monitoring segment identifier set is invalid, cause the switch to not push the compressed sequence of segment identifiers onto a second label stack of a second data packet received by the switch prior to transmitting the second data packet.

In some implementations, determining that the path defined by the monitoring segment identifier set is invalid can include detecting a change in the network that would result in a data packet having the first data packet label stack to deviate from the path defined by the monitoring segment identifier set.

In some implementations, the controller can be configured to cause the switch to send active probe traffic to determine the liveliness of the path defined by the monitoring segment identifier set.

In some implementations, the switch can be an ingress switch at the edge of an autonomous network.

In some implementations, the controller can be configured to maintain a second monitoring segment identifier set including a second sequence of adjacency segment identifiers defining a second path for traffic intended for the destination device. The controller can be configured to maintain a second forwarding segment identifier set corresponding to the second monitoring segment identifier set. The second forwarding segment identifier set can include a second compressed sequence of segment identifiers, together representing a compressed version of the second monitoring segment identifier set. The second compressed sequence of segment identifiers, when pushed onto a label stack, can cause traffic having the label stack to follow the second path defined by the second monitoring segment identifier set. The controller can be configured to, subject to determining that the path defined by the monitoring segment identifier set is invalid, cause the switch to push the second compressed sequence of segment identifiers onto the second data packet prior to transmitting the second data packet.

In some implementations, the controller can be a separate device external to the switch and controlling multiple additional switches.

In some implementations, the controller can determine that the path defined by the monitoring segment identifier set is invalid due to detecting a failure of a link or node in the path. The controller can be configured to instruct the switch via an API to replace the monitoring segment identifier set with the second monitoring segment identifier set and the forwarding segment identifier set with the second forwarding segment identifier set.

In some implementations, the controller can detect the failure through observation of the installed forwarding entries of devices within the network.

In some implementations, the controller can detect the failure through observation of an interior gateway protocol link state database.

At least one aspect is directed to a method of network traffic engineering. The method includes maintaining, by a controller of a network traffic engineering system, a monitoring segment identifier set including a sequence of adjacency segment identifiers defining a path for traffic intended for a destination device. The method includes maintaining, by the controller, a forwarding segment identifier set corresponding to the monitoring segment identifier set. The forwarding segment identifier set includes a compressed sequence of segment identifiers representing a compressed version of the monitoring segment identifier set. The compressed sequence of segment identifiers, when pushed onto a label stack, will cause traffic having the label stack to follow the path defined by the monitoring segment identifier set. The method includes monitoring, by the controller, a status of the path defined by the monitoring segment identifier set. The method includes receiving a first data packet at a switch. The method includes, subject to determining that the path defined by the monitoring segment identifier set is valid, causing, by the controller, the switch to push the compressed sequence of segment identifiers onto a first label stack of a first data packet received by the switch prior to transmitting the first data packet. The method includes receiving a second data packet at the switch. The method includes, subject to determining that the path defined by the monitoring segment identifier set is invalid, causing, by the controller, the switch to not push the compressed sequence of segment identifiers onto a second label stack of a second data packet received by the switch prior to transmitting the second data packet.

In some implementations, determining that the path defined by the monitoring segment identifier set is invalid can include detecting a change in the network that would result in a data packet having the first data packet label stack to deviate from the path defined by the monitoring segment identifier set.

In some implementations, the controller can be configured to cause the switch to send active probe traffic to determine the liveliness of the path defined by the monitoring segment identifier set.

In some implementations, the switch can be an ingress switch at the edge of an autonomous network.

In some implementations, the controller can be integrated within the switch.

In some implementations, the method can include maintaining, by the controller, a second monitoring segment identifier set including a second sequence of adjacency segment identifiers defining a second path for traffic intended for the destination device. The method can include maintaining, by the controller, a second forwarding segment identifier set corresponding to the second monitoring segment identifier set. The second forwarding segment identifier set can include a second compressed sequence of segment identifiers, together representing a compressed version of the second monitoring segment identifier set. The second compressed sequence of segment identifiers, when pushed onto a label stack, can cause traffic having the label stack to follow the second path defined by the second monitoring segment identifier set. The method can include, subject to determining that the path defined by the monitoring segment identifier set is invalid, causing, by the controller, the switch to push the second compressed sequence of segment identifiers onto the second data packet prior to transmitting the second data packet.

In some implementations, the controller can be a separate device external to the switch and controlling multiple additional switches.

In some implementations, the controller can determine that the path defined by the monitoring segment identifier set is invalid due to detecting a failure of a link or node in the path. The method can include instructing, by the controller, the switch to replace the monitoring segment identifier set with the second monitoring segment identifier set and the forwarding segment identifier set with the second forwarding segment identifier set.

In some implementations, the method can include detecting, by the controller, the failure through observation of the installed forwarding entries of devices within the network.

In some implementations, the controller can detect the failure through observation of an interior gateway protocol link state database.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
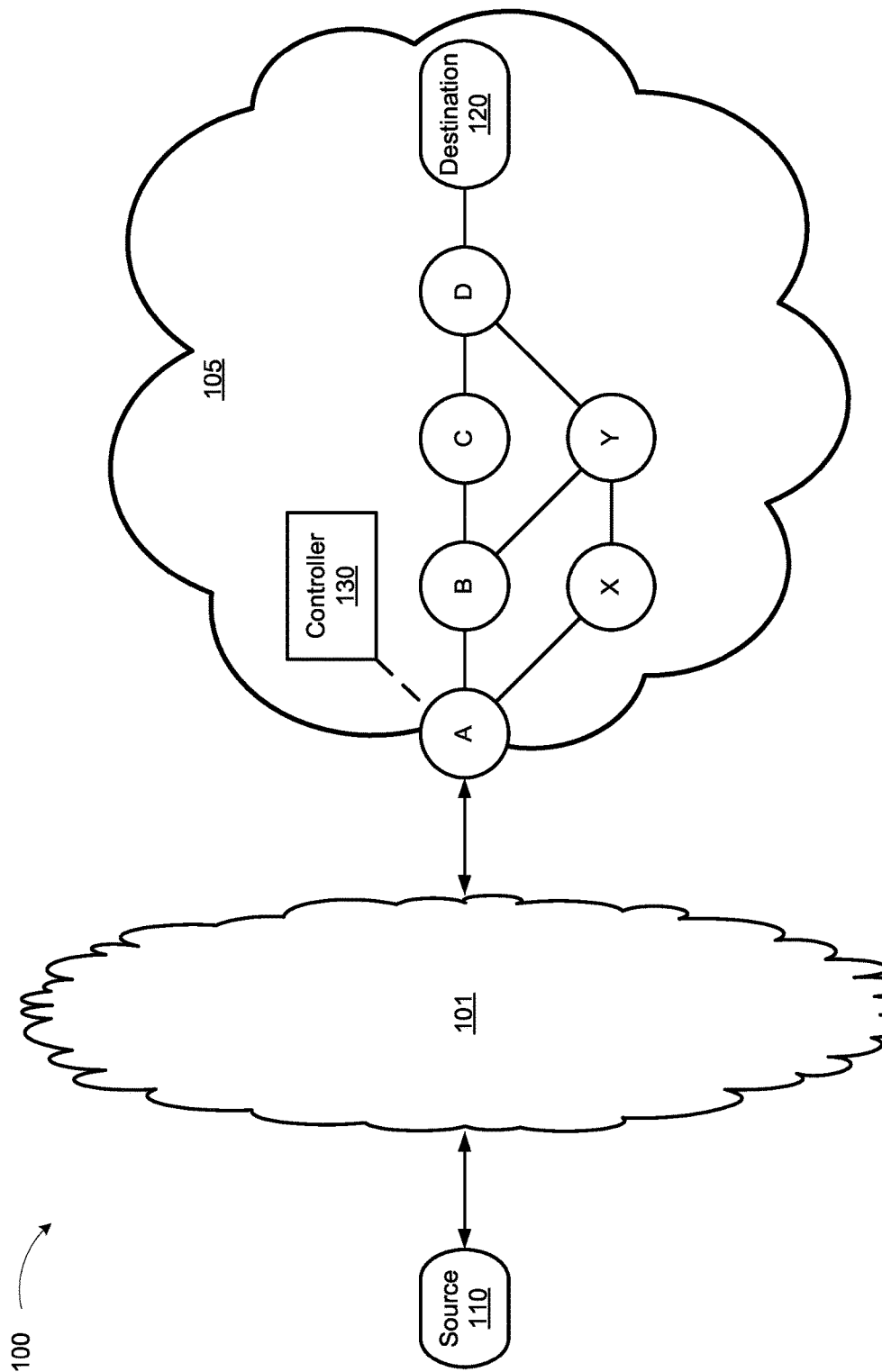
FIG. 1 illustrates an environment including a network traffic engineering system, according to an illustrative implementation.

This disclosure generally relates to a mechanism and apparatus for path protection when using compressed segment routing label stacks. Segment routing allows a traffic engineering system to route traffic across a multiprotocol label switching (MPLS) data plane using segments that indicate particular forwarding instructions to the network. The segments can be of two types: (1) a prefix segment identifier, which can instruct a network node to forward the traffic along the shortest path to a particular resource, such as a device or set of devices; or (2) an adjacency segment identifier, which instructs the network node to forward the traffic via a particular link within a topology. The head-end device of a particular path can route packets along the path by imposing MPLS labels corresponding to one or more segments of the path.

The traffic engineering system can use segment routing to dictate a strict, traffic engineered path for data packets traveling through a network. When a packet enters the network, the traffic engineering system can cause the ingress device to impose a label stack on the packet, where each label includes an adjacency segment identifier for a link in the dictated path. The path for the data packet will thus have strict affinity to the particular links selected by the traffic engineering system. In practice, however, the use of adjacency segment identifiers to specify each link in the desired path has several challenges:

The ingress devices may have hardware limitations that limit the number of labels that the devices can push onto a packet.

The transit devices may have hardware limitations that limit the depth into the packet that the devices can inspect. Such limitations result in the inability to hash traffic across links in the topology having many underlying links, such as Ethernet link aggregation groups.

The additional labels imposed on the stack may introduce additional processing overhead by carrying more data in pathing information, which uses higher bandwidth and reduces the efficiency of the network.

Failure of a link specified by an adjacency segment identifier can cause blackholing, or may require complex protection schemes.

The traffic engineering system can avoid these challenges by compressing the MPLS label stack. The compressed stack can include a compressed sequence of segment identifiers containing a smaller number of segment identifiers than the sequence of adjacency segment identifiers that strictly defines the path. The compressed sequence of segment identifiers can include a prefix segment identifier in place of multiple adjacency segment identifiers. In some cases, however, the compressed sequence of segment identifiers may still include a smaller number of adjacency segment identifiers than the uncompressed sequence. Because the compressed sequence segment identifiers need not specify every link the traffic is to traverse, the label stack can require fewer labels to route traffic to the same destination. The compressed sequence of segment identifiers can correspond to a device or set of devices, which themselves may be reached through more than one link hop within the path by following a predictable path, chosen according to an algorithm that is known by all devices in the system, towards the entity represented by the prefix segment identifier. For example, the predictable path may conform to the interior gateway protocol (IGP) shortest path. Use of prefix segment identifiers, however, results in the inability of the traffic engineering system to guarantee that traffic is always routed over the intended set of links. For example, following a change in the network, the traffic engineered path may no longer follow the controller's calculated path to the resource indicated by a prefix segment identifier. The traffic may therefore deviate from the intended traffic engineered path. The deviation may occur without the knowledge of the ingress device, limiting the ability of the ingress device to respond to the change. In some situations, the change in routing may violate a constraint of the traffic placement on the network and possibly cause congestion along one or more other paths. Therefore, what is needed is a manner of implementing path protection to reroute traffic without violating traffic constraints when using compressed label stacks.

In order to achieve strict route assignment using a compressed label stack, this disclosure provides a method and apparatus for maintaining two different label stacks for each traffic engineered path. The first label stack is referred to as the "monitoring label stack" and is using for monitoring the intended path for the forwarding label stack. The second label stack is referred to as the "forwarding label stack" and includes the MPLS labels pushed onto a data packet. In other words, the monitoring label stack includes each adjacency segment identifier of the intended path, while the corresponding forwarding label stack represents a compressed label stack that, when pushed onto the data packet, will cause the data packet to traverse the intended path for as long as network conditions along the path remain unchanged.

In some implementations, the traffic engineering system can implement a path protection system. For example, the traffic engineering system can monitor for failures in the links and nodes of the path defined by the monitoring label stack. If the traffic engineering system discovers that a failure renders the path invalid, it can cause the forwarding label stack to become ineligible for traffic forwarding. In this manner, the traffic engineering system can prevent data from being automatically rerouted by the interior gateway protocol (IGP) in possible violation of a traffic constraint.

In some implementations, the traffic engineering system can maintain an ordered set of inactive or standby paths. Each standby path can be defined by another forwarding label stack and monitoring label stack path. When an active path becomes ineligible, the traffic engineering system can reroute traffic according one of the standby paths.

FIG. 1 illustrates an environment 100 including a network traffic engineering system, according to an illustrative implementation. The environment 100 includes a source 110 and a destination 120 exchanging traffic over a communication network 101 and an autonomous network 105. The communication network 101 can include, for example and without limitation, a local area network (LAN), a wide area network (WAN), an inter-network (e.g., the Internet), and/or a peer-to-peer network (e.g., an ad hoc peer-to-peer network). The autonomous network 105 can include, for example and without limitation, a LAN, a WAN, an inter-network (e.g., the Internet), or a peer-to-peer network. The autonomous network 105 includes multiple network switches, or "nodes," including nodes A, B, C, D, X, and Y. Node A can be an ingress switch at the edge of the autonomous network 105. Node A can operate under the control of a network controller, such as the controller 130. In some implementations, the controller 130 can be integrated with node A. In some implementations, the controller 130 can be external to node A, and in some implementations external to the autonomous network 105. In some implementations, the controller 130 can additionally control one or more of the routing nodes B, C, D, X, and Y. In some implementations, the autonomous network 105 can be a software-defined network (SDN) where the nodes A, B, C, D, X, and Y are under the control of one or more controllers 130. The controller 130 can implement the network traffic engineering system, including a system of path protection when using compressed segment routing label stacks.

In the environment 100, the source 110 can transmit data packets to the destination 120, and receive data packets back from the destination 120. Packets transmitted by the source 110 can traverse the communication network 101 and enter the autonomous network 105 at, for example, node A. Node A can be an ingress switch at the edge of the autonomous network 105. In order to route the packets to the destination 120, node A can impose a label or label stack on the packets. The label can include a multipath label switching (MPLS) routing identifier for node D, the node adjacent to the destination 120. The label can be read by the other nodes of the autonomous network 105, and used to direct the packet to the destination 120. The path that the packet will take through the autonomous network can be determined by the interior gateway protocol (IGP) shortest path. If a link in the primary path fails, the nodes may route the packet along a different, secondary path. In some cases, however, routing the packets along the secondary path may violate a constraint of traffic placement on the network. For example, relatively low-priority traffic between the source 110 and the destination 120 may cause congestion at a link reserved for a path designated for carrying higher-priority traffic. Such a situation is illustrated below with reference to the example shown in FIGS. 2A and 2B.

Figure 2A:
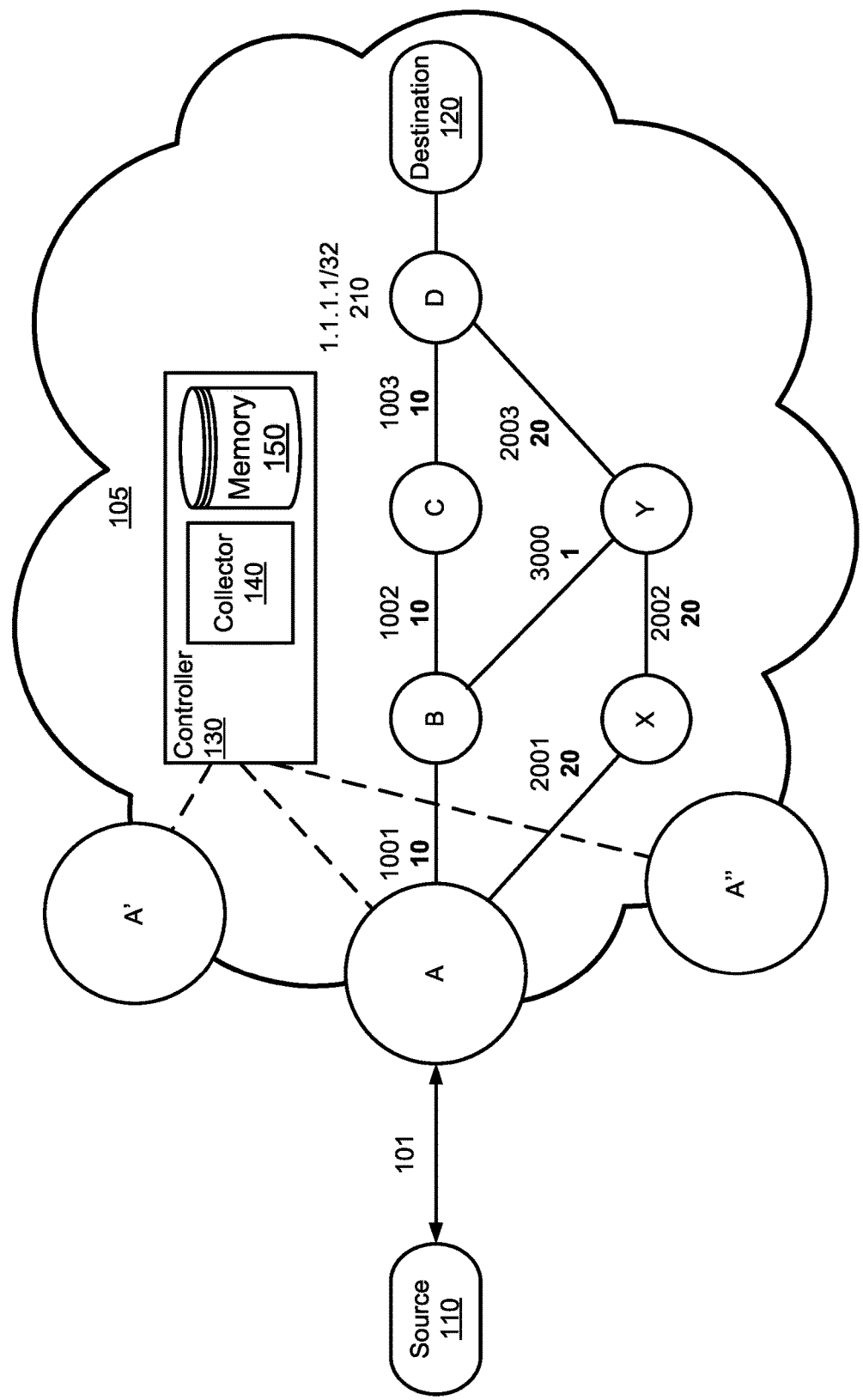
FIGS. 2A and 2B illustrate an example of an autonomous network under control of a network traffic engineering system, according to an illustrative implementation.
Figure 2B:
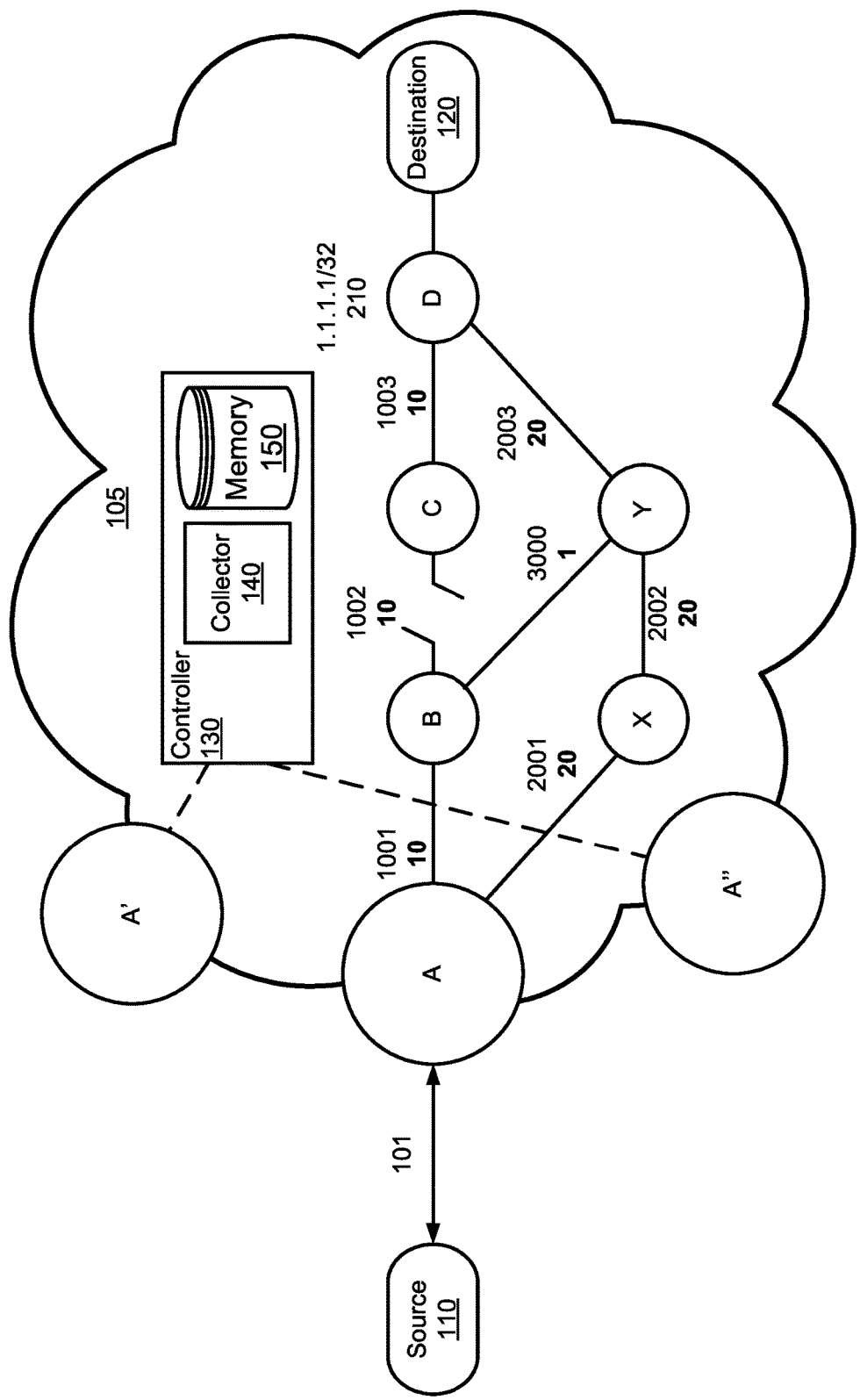

FIGS. 2A and 2B illustrate an example of an autonomous network 105 under control of a network traffic engineering system, according to an illustrative implementation. In FIG. 2A, all links between the nodes A, B, C, D, X, and Y are functional. In FIG. 2B, the link 1002 between the nodes B and C has failed. As in FIG. 1, the source 110 is transmitting packets to the destination 120, which lies within the autonomous network 105. The packets transmitted from the source 110 traverse the communication network 101 before entering the autonomous network 105 via an ingress node A. Node A can be an edge switch or router of the autonomous network 105. Node A can operate under the control of the controller 130. The controller 130 may additionally control one or more other ingress nodes such as node A' and node A". The autonomous network 105 includes additional routing nodes B, C, D, X, and Y. The destination 120 is adjacent to node D. The nodes A, B, C, D, X, and Y are joined by various links. Each link includes the four-digit segment identifier and the two-digit link cost shown for each link in FIGS. 2A and 2B. In practice, however, the segment identifiers and the link costs may have more or fewer digits. The link cost is used in determining the interior gateway protocol (IGP) shortest path through the autonomous network 105. Nodes A and B are connected by link 1001 with an IGP cost of 10. Nodes B and C are connected by link 1002 with an IGP cost of 10. Nodes C and D are connected by link 1003 with an IGP cost of 10. Nodes A and X are connected by link 2001 with an IGP cost of 20. Nodes X and Y are connected by link 2002 with an IGP cost of 20.

The controller 130 includes a collector 140 for receiving link state information from the network, and a memory 150 for maintaining pairs of monitoring segment identifier sets and forwarding segment identifier sets. The memory 150 can also store network status information, and one or more programs of instructions for execution by the controller 130. In some implementations, the controller 130 can be integrated with node A. In some implementations, the controller 130 can be external to node A, and, in some implementations, external to the autonomous network 105. In some implementations, the controller 130 can additionally control one or more of the routing nodes B, C, D, X, and Y. In some implementations, the controller 130 can cause the nodes to send active probe traffic to determine the liveliness of one or more monitoring segment identifier sets. In some implementations, the controller 130 can interface with the routing nodes A, B, C, D, X, and Y using an API. Using the API, the controller 130 can change forwarding entries or device configurations through, for example a management interface such as gNMI or NETCONF, or a control plane interface such as BGP. The controller 130 can, via the collector 140, receive link state information from entities in the network and determine a network status. For example, in some implementations, the collector 140 can interface with the routing nodes A, B, C, D, X, and Y, and monitor the installed forwarding entries at each node. The collector 140 can interface with the routing nodes through a streaming interface. In some implementations, the collector 140 can receive link-state information from the IGP link state database. In some implementations, the controller 130 can compute a mapping between a forwarding resource—e.g., a node interface—and each element of the monitoring segment identifier set. When the controller 130 detects a failure of a mapped forwarding resource, the controller 130 can trigger a change to the compressed sequence of segment identifiers that are imposed onto the label stack at the head-end node of the path that uses the forwarding resource.

The destination 120 is adjacent to Node D. Node D advertises its primary next hop address, 1.1.1.1/32, with an multiprotocol label switching (MPLS) segment routing identifier of 210. When node A receives data packets from the source 110 intended for the destination 120, node A can impose the label 210 onto the packets, and the shortest path to node D will be selected by the autonomous network 105. Node D can forward the packets to the destination 120. The actual path that the label 210 takes through the network is determined by the IGP shortest path. In the case of the autonomous network 105 shown in FIG. 2A, the IGP shortest path is A→B, B→C, C→D, with an IGP cost of 30. Thus, packets traveling from node A having an MPLS label 210 will traverse this route to node D and destination 120 until a change in network conditions renders this path invalid. The path can be rendered invalid due to, for example, a failure of a node or link along the path, a change in network topology, or a change in IGP link cost of one or more links. When the path becomes invalid, a data packet having an MPLS label 210 may deviate from the desired path. An example of the path becoming invalid due to a link failure is shown in FIG. 2B.

FIG. 2B shows the same autonomous network 105 as FIG. 2A, but with a failed link 1002. Packets traveling from node A with an MPLS label 210 will follow a new lowest-cost path for traversing the autonomous network 105. In this case, the next lowest-cost path will be A→B, B→Y, Y→D; that is, substituting links 3000 and 2003 for links 1002 and 1003, and routing through node Y instead of node C. While switching to this secondary path can maintain the integrity of the connection, the automatic re-routing of traffic between the source 110 and the destination 120 may violate a constraint of traffic placement on the autonomous network 105; for example, if relatively low-priority traffic between the source 110 and the destination 120 causes congestion along the link 3000, which may be reserved for higher-priority traffic. Furthermore, if the controller 130 and node A have defined the desired path only in terms of the forwarding label, nether the controller 130 nor node A may have enough information to monitor the status of the desired path, since the desired path is no longer strictly defined.

It may be possible for node A to route traffic strictly via a desired path using segment routing with adjacency segment identifiers, for example A→B, B→C, C→D. Node A could do so by pushing labels corresponding each link of the desired path onto the packets. Doing so, however, can present several challenges. First, node A must be able to impose a label stack three labels deep. Second, nodes B and C must be able to hash based on this label stack depth. Third, the two additional labels on each packet create additional overhead. And finally, a failed link or node along the path could result in blackholing of the traffic. In autonomous networks having an even greater number of hops between the ingress node and internal destinations, these challenges can become prohibitive.

This disclosure therefore describes a scheme where traffic can be routed strictly from node A to the destination 120 without requiring node A to impose a label stack having adjacency segment identifiers for each link along the desired path. This scheme can maintain a predetermined alternate path for the traffic in the event of the desired path becoming invalid due to a link failure, network topology change, or other change in network conditions. To achieve this, the path between node A and the destination 120 can be calculated by some entity (for example, the controller 130) in terms of the total set of links that are to be traversed. The resulting label stack can be referred to as a monitoring segment identifier set. The monitoring segment identifier set can include a sequence of adjacency segment identifiers that strictly define each link along the desired path. The calculating entity can then compress this label stack to the minimum depth required in order to route traffic from node A to the destination 120 along the desired path. The compressed label stack corresponds to the monitoring segment identifier set and can be referred to as a forwarding segment identifier set. The forwarding segment identifier set includes a compressed sequence of segment identifiers that together represent a compressed version of the monitoring segment identifier set. The compressed stack can include a compressed sequence of segment identifiers containing a smaller number of segment identifiers than the sequence of adjacency segment identifiers that strictly defines the path. The compressed sequence of segment identifiers can include a prefix segment identifier in place of multiple adjacency segment identifiers. In some cases, however, the compressed sequence of segment identifiers may still include a smaller number of adjacency segment identifiers than the uncompressed sequence. When pushed onto a label stack, the compressed sequence of segment identifiers will cause packets having the label stack to follow the path defined by the monitoring segment identifier set, as long as network conditions along the path remain unchanged. Node A can push the compressed sequence of segment identifiers onto packets received from the source 110 and intended for the destination 120. Meanwhile, the controller 130 can monitor a status of the path defined by the adjacency segment identifiers in the monitoring segment identifier set. If the controller 130 detects a network change in the path defined by the adjacency segment identifiers in the monitoring segment identifier set that renders the path invalid, the controller 130 can cause Node A to halt or pause the use of the forwarding segment identifier set. In some implementations, the controller 130 can instruct node A to fall back to an alternative monitoring segment identifier set and alternative forwarding segment identifier set pair defining a secondary or backup path.

The controller 130 can continually monitor the status of the autonomous network 105. In some implementations, the controller 130 can monitor the network status by observing the installed forwarding entries of devices in the network including the nodes A, B, C, D, X, and Y. In some implementations, the controller 130 can receive changes in the forwarding entries through a streaming interface from the devices. In some implementations, the controller 130 can monitor the network status by observing the IGP link state database. In some implementations, the controller 130 can monitor the network by instructing the network nodes to transmit probe packets across the autonomous network 105. The controller 130 can receive the link state data via the collector 140. The controller 130 can store the network status information in the memory 150.

Figure 3:
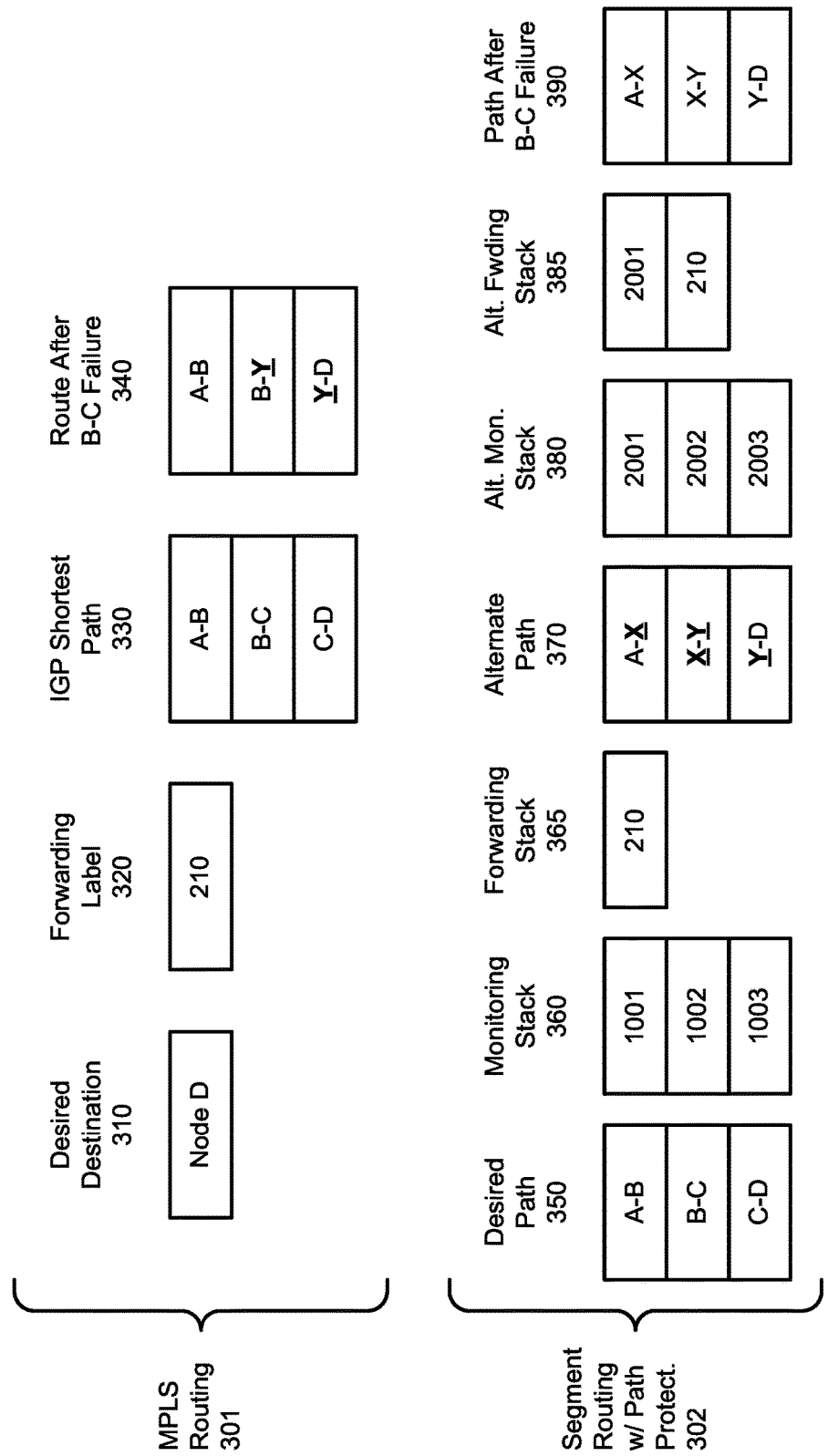
FIG. 3 shows example label stacks and path for both MPLS routing and segment routing with path protection, according to an illustrative implementation.

The controller 130 can provide a system of path protection by providing for an alternative path for the traffic in the event the primary path becomes invalid. If the controller 130 receives an indication that the path defined by the monitoring segment identifier set is no longer valid, either due to a link failure or change network topology, the controller 130 can instruct node A to cease using the compressed sequence of segment identifiers. Halting or pausing the traffic in this manner can prevent the traffic from rerouting automatically based on IGP and possibly violating a network traffic constraint. Node A can fall back to routing the traffic via an alternative path defined by a second monitoring segment identifier set and second forwarding identifier set. The controller 130 can store monitoring segment identifier set and forwarding segment identifier set pairs in the memory 150. In some implementations, each node can store a monitoring segment identifier set and forwarding segment identifier set pair for each path in a local memory. In some implementations, each node can store a primary monitoring segment identifier set and forwarding segment identifier set pair, and a secondary (alternate) monitoring segment identifier set and forwarding segment identifier set pair, for each path. FIG. 3, described below, illustrates different MPLS segment routing schemes.

FIG. 3 shows example label stacks and path for both conventional MPLS routing 301 and segment routing with path protection 302, according to an illustrative implementation. Using conventional MPLS segment routing 301, node A can determine the desired destination 310 for data packets from the source 110 intended for the destination 120. In this case, the destination 120 is outside of the area of the network governed by interior gateway protocol (IGP); therefor, traffic intended for the destination 120 is routed via the next-hop node for the destination 120, node D. Accordingly, node A can impose an MPLS forwarding label 320 on packets from the source 110 to node D. Packets having the MPLS label 210 traversing the autonomous network 105 under the conditions illustrated in FIG. 2A will follow the IGP shortest path 330; namely A→B, B→C, C→D. If the link 1002 fails as shown in FIG. 2B, however, the IGP shortest path after failure 340 will reroute to A→B, B→Y, Y→D.

Using segment routing with path protection 302, the controller 130 can specify a strict path for the data packets from the source 110 intended for the destination 120 along the desired path 350. The desired path 350 under the network conditions shown in FIG. 2A is A→B, B→C, C→D. The monitoring stack 360 corresponding to the desired path 350 includes adjacency segment identifier for each link along the desired route; that is, 1001, 1002, and 1003. To avoid having to impose a label stack three deep onto the data packets, the controller 130 can compress the monitoring stack 360 down to only the MPLS segment routing labels necessary to cause data packets to traverse the autonomous network 105 along the desired path 350. As previously described, under the network conditions shown in FIG. 2A, packets will follow the path A→B, B→C, C→D if imposed with a forwarding label of 210. Accordingly, the controller 130 can compress the monitoring stack 360 down to a corresponding forwarding stack 365 consisting of only the forwarding label 210. Packets having this forwarding stack 365 will continue traversing the autonomous network 105 via the path A→B, B→C, C→D as long as the network remains unchanged.

If one of the links in the desired path fails or is altered, packets having the forwarding stack 365 with the forwarding label 210 may not continue to follow the desired path. The controller 130 can monitor the desired path using the information in the monitoring stack 360. If the path becomes invalid for some reason, the controller 130 can impose an alternate path. For example, in FIG. 2B, the link 1002 has failed. Assuming that, due to traffic constraints, packets should not be re-routed across the link B→Y, node A can fall back to using an alternate path 370. In this case, the alternate path 370 will follow A→X, X→Y, Y→D. The alternate monitoring stack 380 corresponding to this path will be 2001, 2002, 2003. The controller 130 can compress alternate monitoring stack 380 of adjacency segment identifiers down to the alternate forwarding stack 385. In the example shown in FIG. 2B, the system need only impose the adjacency segment identifier corresponding to node Y (i.e., 2001) and the MPLS label for node D (i.e., 210). Under the network conditions in FIG. 2B, packets arriving at node Y and labeled for node D will follow the alternate path 370 without any additional information. Accordingly, the alternate monitoring stack 380 will include the links 2001, 2002, and 2003. The alternate forwarding stack 385 will include segment identifiers 2001 and 210. The path after failure of the B-C link 390 will be A→X, X→Y, Y→D. Therefore, the verboten link B→Y is avoided and no traffic constraints are violated. An example method for performing segment routing with path protection is described below with reference to FIG. 4.

Figure 4:
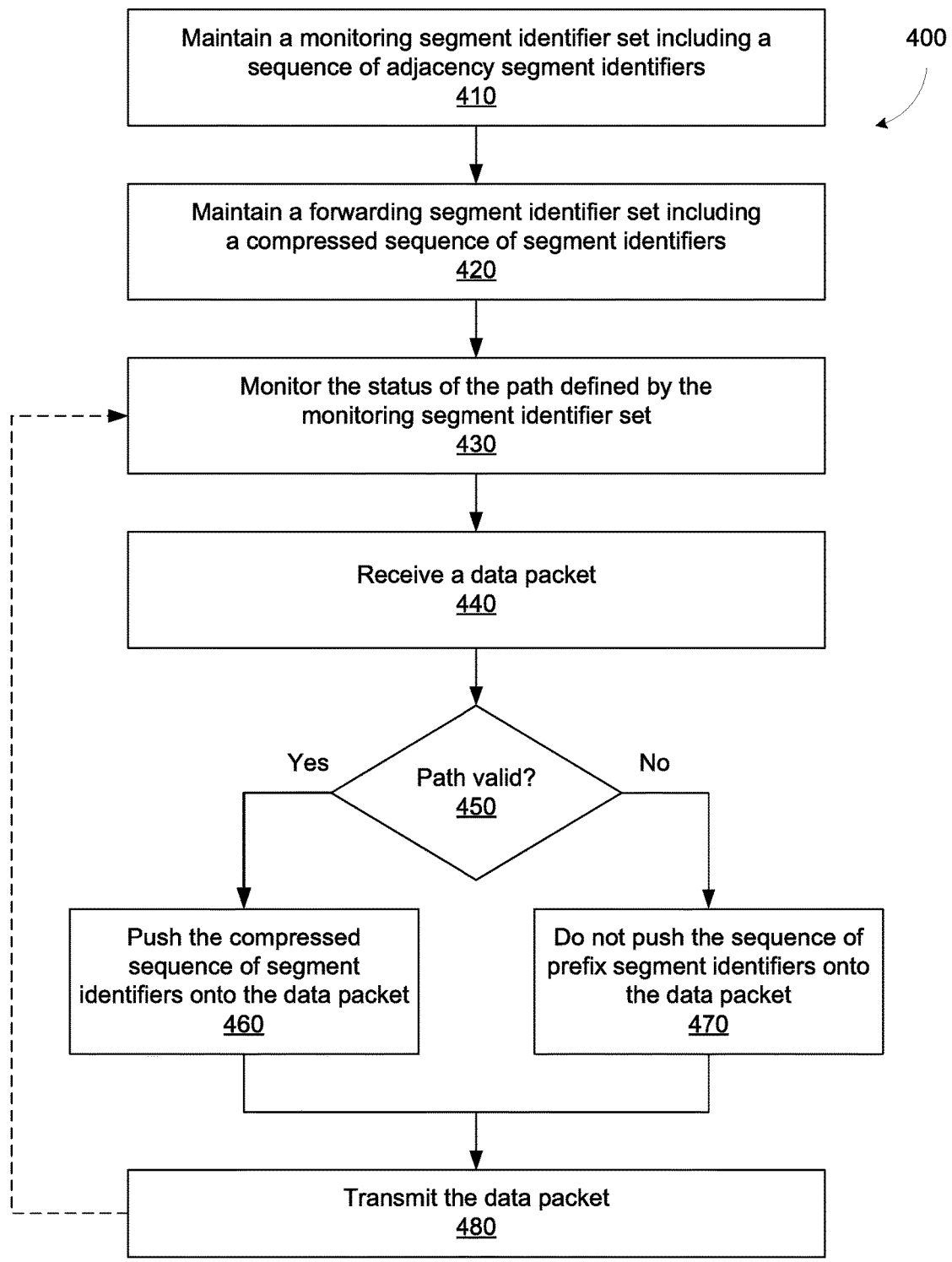
FIG. 4 is flowchart of an example method of network traffic engineering, according to an illustrative implementation.

FIG. 4 is flowchart of an example method 400 of network traffic engineering, according to an illustrative implementation. The method 400 includes maintaining a monitoring segment identifier set including a sequence of adjacency segment identifiers (stage 410). The method 400 includes maintaining a forwarding segment identifier set including a compressed sequence of segment identifiers (stage 420). The method 400 includes monitoring the status of the path defined by the monitoring segment identifier set (stage 430). The method 400 includes receiving a data packet (stage 440). The method 400 includes determining whether the path defined by the monitoring segment identifier set is valid (decision 450). If the path is valid, the method 400 includes pushing the compressed sequence of segment identifiers onto the data packet (stage 460). If the path is invalid, the method 400 includes not pushing the sequence of prefix identifiers onto the data packet (stage 470). The method 400 includes transmitting the data packet (stage 480).

The method 400 includes maintaining a monitoring segment identifier set including a sequence of adjacency segment identifiers (stage 410). The segment identifier set can be maintained by a network controller, such as the controller 130 previously described. The sequence of adjacency segment identifiers can define a path for traffic from a source, such as the source 110 previously described, intended for a destination device, such as the destination device 120 previously described. The monitoring segment identifier set can be, for example, a monitoring stack such as the monitoring stack 460 described above with reference to FIG. 3.

The method 400 includes maintaining a forwarding segment identifier set including a compressed sequence of segment identifiers (stage 420). The forwarding segment identifier set can correspond to the monitoring segment identifier set. The forwarding segment identifier set can be maintained by the network controller. The compressed sequence of segment identifiers can represent a compressed version of the monitoring segment identifier set. The compressed stack can include a compressed sequence of segment identifiers containing a smaller number of segment identifiers than the sequence of adjacency segment identifiers that strictly defines the path. The compressed sequence of segment identifiers can include a prefix segment identifier in place of multiple adjacency segment identifiers. In some cases, however, the compressed sequence of segment identifiers may still include a smaller number of adjacency segment identifiers than the uncompressed sequence. The compressed sequence of segment identifiers will, when pushed onto a label stack, cause data packets having the label stack to follow the path defined by the monitoring segment identifier set. The controller can maintain ordered pairs of monitoring segment identifier sets and their corresponding forwarding segment identifier sets in a memory, such as the memory 150.

The method 400 includes monitoring the status of the path defined by the monitoring segment identifier set (stage 430). The controller can use the information in the monitoring segment identifier set to monitor the status of each link and/or node along the path that it defines. In some implementations, the controller can monitor the path status by observing the installed forwarding entries of the nodes of the autonomous network. In some implementations, the controller can receive changes in the forwarding entries through a streaming interface from the nodes. In some implementations, the controller can monitor the network status by observing a IGP link state database associated with the autonomous network. In some implementations, the controller can monitor the network by instructing the nodes to transmit probe packets across the autonomous network. The controller can monitor for network changes that would result in a data packet having the compressed sequence of segment identifiers in its label stack to deviate from the path defined by the monitoring segment identifier set.

The method 400 includes receiving a data packet (stage 440). The data packet can be received from the source by a node or switch. The node can be an ingress switch or router at the end of an autonomous network, such as the autonomous network 105 previously described. The node can determine that the data packet is indented for the destination device, and thus that it should follow the path described by the monitoring segment identifier set, if that path is valid.

The method 400 includes determining whether the path defined by the monitoring segment identifier set is valid (decision 450). If the path is valid, the method 400 includes pushing the compressed sequence of segment identifiers onto a label stack of the data packet (stage 460) and transmitting the data packet (stage 480). If the path is valid, the node can push the compressed sequence of segment identifiers onto the data packet and transmit it along a path indicated by the compressed sequence of segment identifiers. In some implementations, the method 400 can repeat beginning at stage 430.

If the path is invalid (decision 450), the method 400 includes not pushing the sequence of prefix identifiers onto the data packet (stage 470). In some implementations, the controller will maintain an alternate monitoring segment identifier set/forwarding segment identifier set pair describing an alternate path for traffic intended for the destination device. The alternate monitoring segment identifier set can include an alternate sequence of adjacency segment identifiers defining the alternate path. The alternate forwarding segment identifier set corresponds to the alternate monitoring segment identifier set. The alternate forwarding segment identifier set includes an alternate compressed sequence of segment identifiers. In the event the controller determines that the path is invalid, the controller can cause the switch to push the alternate compressed sequence of segment identifiers onto the packet. The method 400 includes transmitting the data packet (stage 480). The node can transmit the data packet along a path indicated by the alternate compressed sequence of segment identifiers. In some implementations, the method 400 can repeat beginning at stage 430.

Figure 5:
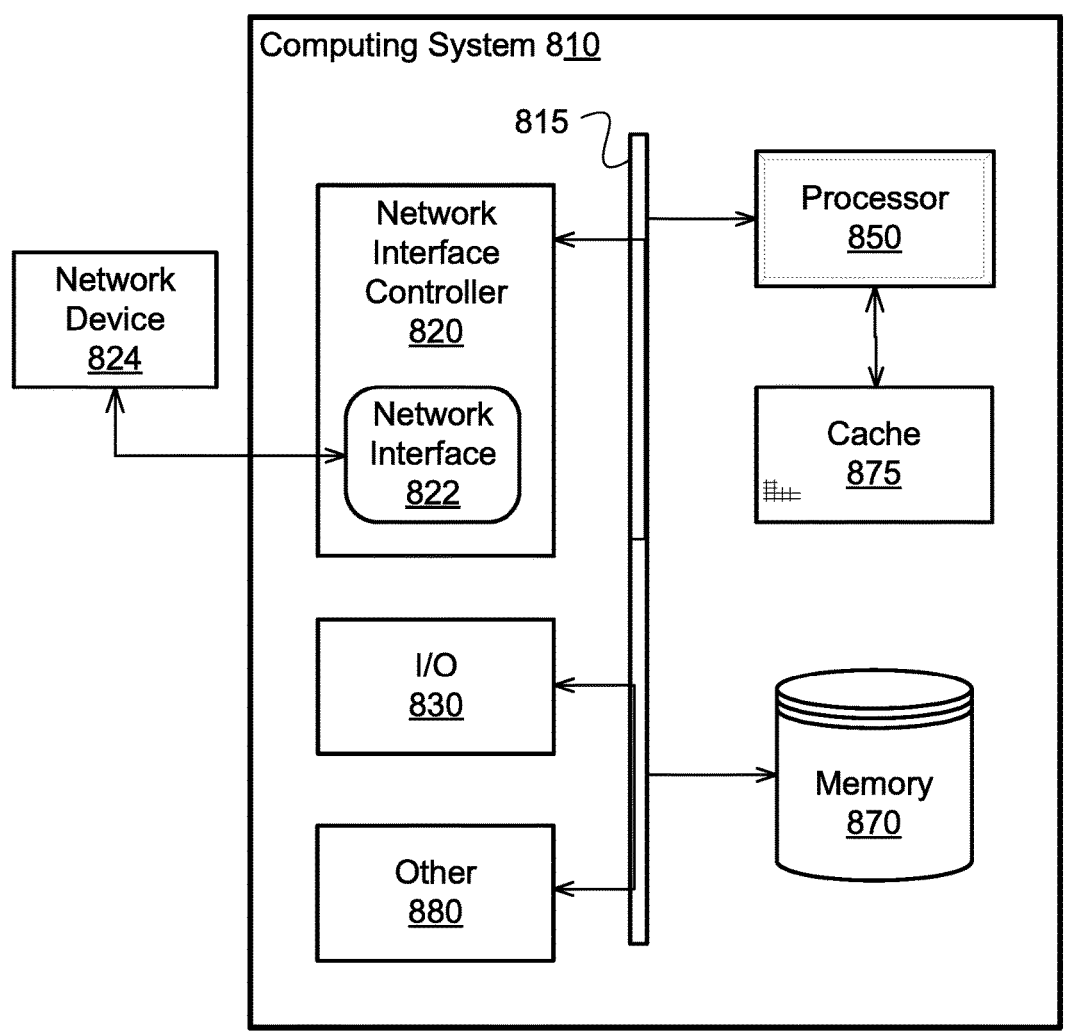
FIG. 5 is a block diagram illustrating a general architecture for a computer system that may be employed to implement elements of the systems and methods described and illustrated herein, according to an illustrative implementation.

FIG. 5 is a block diagram illustrating a general architecture for a computer system 800 that may be employed to implement elements of the systems and methods described and illustrated herein, according to an illustrative implementation. The computing system 800 can be used to implement one or more of the devices described above, including the source 110, the destination 120, the controller 130, or one or more of the nodes A, B, C, D, X, and Y. The computing system 800 may be utilized in implementing the traffic engineering method 400 shown in FIG. 4.

In broad overview, the computing system 810 includes at least one processor 850 for performing actions in accordance with instructions and one or more memory devices 870 or 875 for storing instructions and data. The illustrated example computing system 810 includes one or more processors 850 in communication, via a bus 815, with at least one network interface controller 820 with one or more network interface ports 822 connecting to one or more network devices 824, memory 870, and any other devices 880, e.g., an I/O interface. Generally, a processor 850 will execute instructions received from memory. The processor 850 illustrated incorporates, or is directly connected to, cache memory 875.

In more detail, the processor 850 may be any logic circuitry that processes instructions, e.g., instructions fetched from the memory 870 or cache 875. In many embodiments, the processor 850 is a microprocessor unit or special purpose processor. The computing device 800 may be based on any processor, or set of processors, capable of operating as described herein. In some implementations, the processor 850 can be capable of executing the traffic engineering method 400 shown in FIG. 4. The processor 850 may be a single core or multi-core processor. The processor 850 may be multiple processors. In some implementations, the processor 850 can be configured to run multi-threaded operations. In some implementations, the processor 850 may host one or more virtual machines or containers, along with a hypervisor or container manager for managing the operation of the virtual machines or containers. In such implementations, the traffic engineering method 400 shown in FIG. 4 can be implemented within the virtualized or containerized environments provided on the processor 850.

The memory 870 may be any device suitable for storing computer readable data. The memory 870 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 800 may have any number of memory devices 870. In some implementations, the memory 870 can include instructions corresponding to the traffic engineering method 400 shown in FIG. 4. In some implementations, the memory 870 supports virtualized or containerized memory accessible by virtual machine or container execution environments provided by the computing system 810.

The cache memory 875 is generally a form of computer memory placed in close proximity to the processor 850 for fast read times. In some implementations, the cache memory 875 is part of, or on the same chip as, the processor 850. In some implementations, there are multiple levels of cache 875, e.g., L2 and L3 cache layers.

The network interface controller 820 manages data exchanges via the network interfaces 822 (also referred to as network interface ports). The network interface controller 820 handles the physical and data link layers of the OSI model for network communication. In some implementations, some of the network interface controller's tasks are handled by the processor 850. In some implementations, the network interface controller 820 is part of the processor 850. In some implementations, a computing system 810 has multiple network interface controllers 820. The network interfaces 822 are connection points for physical network links. In some implementations, the network interface controller 820 supports wireless network connections and an interface port 822 is a wireless receiver/transmitter. Generally, a computing device 810 exchanges data with other network devices 824 via physical or wireless links to a network interfaces 822. In some implementations, the network interface controller 820 implements a network protocol such as Ethernet.

The other network devices 824 are connected to the computing device 810 via a network interface port 822. The other network devices 824 may be peer computing devices, network devices, or any other computing device with network functionality. For example, a first network device 824 may be a network device such as a hub, a bridge, a switch, or a router, connecting the computing device 810 to a data network such as the Internet.

The other devices 880 may include an I/O interface, external serial device ports, and any additional co-processors. For example, a computing system 810 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 800 includes an additional device 880 such as a coprocessor, e.g., a math co-processor can assist the processor 850 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A network traffic engineering system comprising:
   a switch; and
   a controller configured to:
   maintain a monitoring segment identifier set including a sequence of adjacency segment identifiers defining a path for traffic intended for a destination device, wherein each adjacency segment identifier identifies a specific link of a network;
   maintain a forwarding segment identifier set corresponding to the monitoring segment identifier set, the forwarding segment identifier set including a compressed sequence of segment identifiers, together representing a compressed version of the monitoring segment identifier set such that the compressed sequence of segment identifiers, when pushed onto a label stack, will cause traffic having the label stack to follow the path defined by the monitoring segment identifier set;
   monitor a status of the path defined by the monitoring segment identifier set;
   subject to determining that the path defined by the monitoring segment identifier set is valid, cause the switch to push the compressed sequence of segment identifiers onto a first label stack of a first data packet received by the switch prior to transmitting the first data packet; and
   subject to determining that the path defined by the monitoring segment identifier set is invalid, cause the switch to not push the compressed sequence of segment identifiers onto a second label stack of a second data packet received by the switch prior to transmitting the second data packet.

2. The network traffic engineering system of claim 1, wherein determining that the path defined by the monitoring segment identifier set is invalid includes detecting a change in the network that would result in a data packet having the first data packet label stack to deviate from the path defined by the monitoring segment identifier set.

3. The network traffic engineering system of claim 1, wherein the controller is configured to cause the switch to send active probe traffic to determine whether the path defined by the monitoring segment identifier set is valid.

4. The network traffic engineering system of claim 1, wherein the switch is an ingress switch at the edge of an autonomous network.

5. The network traffic engineering system of claim 4, wherein the controller is integrated within the switch.

6. The network traffic engineering system of claim 5, wherein the controller is configured to:
   maintain a second monitoring segment identifier set including a second sequence of adjacency segment identifiers defining a second path for traffic intended for the destination device;
   maintain a second forwarding segment identifier set corresponding to the second monitoring segment identifier set, the second forwarding segment identifier set including a second compressed sequence of segment identifiers, together representing a compressed version of the second monitoring segment identifier set such that the second compressed sequence of segment identifiers, when pushed onto a label stack, will cause traffic having the label stack to follow the second path defined by the second monitoring segment identifier set;
   subject to determining that the path defined by the monitoring segment identifier set is invalid, cause the switch to push the second compressed sequence of segment identifiers onto the second data packet prior to transmitting the second data packet.

7. The network traffic engineering system of claim 4, wherein the controller is a separate device external to the switch and controlling multiple additional switches.

8. The network traffic engineering system of claim 7, wherein:
   the controller determines that the path defined by the monitoring segment identifier set is invalid due to detecting a failure of a link or node in the path; and
   the controller is configured to instruct the switch via an application programming interface (API) to replace the monitoring segment identifier set with the second monitoring segment identifier set and the forwarding segment identifier set with the second forwarding segment identifier set.

9. The network traffic engineering system of claim 8, wherein the controller detects the failure through observation of the installed forwarding entries of devices within the network.

10. The network traffic engineering system of claim 8, wherein the controller detects the failure through observation of an interior gateway protocol link state database.

11. A method of network traffic engineering comprising:
maintaining, by a controller of a network traffic engineering system, a monitoring segment identifier set including a sequence of adjacency segment identifiers defining a path for traffic intended for a destination device;
maintaining, by the controller, a forwarding segment identifier set corresponding to the monitoring segment identifier set, the forwarding segment identifier set including a compressed sequence of segment identifiers representing a compressed version of the monitoring segment identifier set such that the compressed sequence of segment identifiers, when pushed onto a label stack, will cause traffic having the label stack to follow the path defined by the monitoring segment identifier set;
monitoring, by the controller, a status of the path defined by the monitoring segment identifier set;
receiving a first data packet at a switch;
subject to determining that the path defined by the monitoring segment identifier set is valid, causing, by the controller, the switch to push the compressed sequence of segment identifiers onto a first label stack of a first data packet received by the switch prior to transmitting the first data packet;
receiving a second data packet at the switch; and
subject to determining that the path defined by the monitoring segment identifier set is invalid, causing, by the controller, the switch to not push the compressed sequence of segment identifiers onto a second label stack of a second data packet received by the switch prior to transmitting the second data packet.

12. The method of claim 11, wherein determining that the path defined by the monitoring segment identifier set is invalid includes detecting a change in the network that would result in a data packet having the first data packet label stack to deviate from the path defined by the monitoring segment identifier set.

13. The method of claim 11, wherein the controller is configured to cause the switch to send active probe traffic to determine whether the path defined by the monitoring segment identifier set is valid.

14. The method of claim 11, wherein the switch is an ingress switch at the edge of an autonomous network.

15. The method of claim 14, wherein the controller is integrated within the switch.

16. The method of claim 15, comprising:
maintaining, by the controller, a second monitoring segment identifier set including a second sequence of adjacency segment identifiers defining a second path for traffic intended for the destination device;
maintaining, by the controller, a second forwarding segment identifier set corresponding to the second monitoring segment identifier set, the second forwarding segment identifier set including a second compressed sequence of segment identifiers, together representing a compressed version of the second monitoring segment identifier set such that the second compressed sequence of segment identifiers, when pushed onto a label stack, will cause traffic having the label stack to follow the second path defined by the second monitoring segment identifier set;
subject to determining that the path defined by the monitoring segment identifier set is invalid, causing, by the controller, the switch to push the second compressed sequence of segment identifiers onto the second data packet prior to transmitting the second data packet.

17. The method of claim 14, wherein the controller is a separate device external to the switch and controlling multiple additional switches.

18. The method of claim 17, wherein the controller determines that the path defined by the monitoring segment identifier set is invalid due to detecting a failure of a link or node in the path, the method comprising:
instructing, by the controller, the switch to replace the monitoring segment identifier set with the second monitoring segment identifier set and the forwarding segment identifier set with the second forwarding segment identifier set.

19. The method of claim 18, comprising:
detecting, by the controller, the failure through observation of the installed forwarding entries of devices within the network.

20. The network traffic engineering system of claim 18, wherein the controller detects the failure through observation of an interior gateway protocol link state database.

* * * * *